United States Patent
Hori et al.

(10) Patent No.: US 9,609,714 B2
(45) Date of Patent: Mar. 28, 2017

(54) POWER SUPPLY DEVICE AND LIGHTING DEVICE

(71) Applicant: PANASONIC INTELLECTUAL PROPERTY MANAGEMENT CO., LTD., Osaka (JP)

(72) Inventors: Kazuhiro Hori, Niigata (JP); Noriya Hayakawa, Niigata (JP); Hiroshi Ogasawara, Niigata (JP); Masako Matsunaga, Niigata (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 12 days.

(21) Appl. No.: 14/878,113

(22) Filed: Oct. 8, 2015

(65) Prior Publication Data

US 2016/0174316 A1 Jun. 16, 2016

(30) Foreign Application Priority Data

Dec. 15, 2014 (JP) ................. 2014-253321

(51) Int. Cl.
*H05B 33/08* (2006.01)
(52) U.S. Cl.
CPC ..... *H05B 33/0866* (2013.01); *H05B 33/0815* (2013.01); *Y02B 20/46* (2013.01)

(58) Field of Classification Search
None
See application file for complete search history.

(56) References Cited

U.S. PATENT DOCUMENTS

2011/0234109 A1* 9/2011 Chiu ............... H05B 33/0827
  315/185 R
2012/0133291 A1* 5/2012 Kitagawa ......... H05B 33/0812
  315/186

FOREIGN PATENT DOCUMENTS

JP 2011-258517 12/2011

* cited by examiner

*Primary Examiner* — Dedei K Hammond
(74) *Attorney, Agent, or Firm* — Greenblum & Bernstein, P.L.C.

(57) ABSTRACT

A power supply device includes LED driver circuits electrically connected to LED light sources, respectively, and a control circuit. Each of the LED light sources includes light-emitting diodes electrically connected in series. The control circuit is configured, when current is prohibited from flowing through a target light source, to perform control of a target driver circuit so that a voltage lower than a threshold voltage at which current starts to flow through the target light source is applied across the target light source. The target light source is a part of the LED light sources. The target driver circuit includes an LED driver circuit, corresponding to the target light source, of the LED driver circuits.

15 Claims, 6 Drawing Sheets

POWER SUPPLY DEVICE AND LIGHTING DEVICE

CROSS REFERENCE TO RELATED APPLICATIONS

This application claims the benefit and priority of Japanese Patent Application No. 2014-253321, filed on Dec. 15, 2014, the entire contents of which are incorporated herein by reference.

TECHNICAL FIELD

The disclosure relates generally to power supply devices and lighting devices and, more particularly, to a power supply device and a lighting device, each of which is configured to operate light-emitting diodes.

BACKGROUND ART

An LED power supply device as disclosed in JP Pub. No. 2011-258517 (hereinafter referred to as "Document 1") has been so far proposed as a power supply device configured to operate light-emitting diodes (LEDs). The LED power supply device disclosed in Document 1 employs two kinds of LED arrays, color temperatures of which are different from each other, as a light source. The LED power supply device is configured to vary a color temperature of the light source (a color mixing light) by adjusting currents (electric currents) flowing through the two kinds of LED arrays.

The LED power supply device disclosed in Document 1 periodically turns the two LED arrays on and off so that the two LED arrays are alternately lit per period. In this LED power supply device, a color temperature of the light source (the color mixing light) is adjusted by varying a ratio of two time periods in which the two LED arrays are respectively lit during one period.

Considered is a control that allows current to flow through only one LED array while current is prohibited from flowing through another LED array at an upper or lower limit of a color temperature adjusting range. In this case, a large potential difference occurs between both cathode ends of the two LED arrays because both anode ends of the two LED arrays are connected with each other. That is, each of the two LED array is formed of LEDs connected in series, one end of each LED array is a cathode end and another end thereof is an anode end. It is therefore required that two conduction paths electrically connected to the two cathode ends of them be spaced out in order to ensure electrical insulation of a substrate on which the LED arrays and a power supply circuit are mounted. However, this causes the substrate (circuit substrate) to increase in size.

SUMMARY OF THE INVENTION

The present invention has been achieved in view of the above circumstances, and an object thereof is to provide a power supply device and a lighting device, capable of being reduced in size in comparison with a conventional device.

A power supply device according to an aspect of the present invention includes LED driver circuits electrically connected to LED light sources, respectively, and a control circuit. Each of the LED light sources includes light-emitting diodes electrically connected in series. Ends, on anode sides, of the LED light sources are electrically connected to each other. The control circuit is configured to adjust electric currents flowing through the LED light sources through the LED driver circuits, respectively. The control circuit is configured, when current is prohibited from flowing through a target light source, to perform control of a target driver circuit so that a voltage lower than a threshold voltage at which current starts to flow through the target light source is applied across the target light source. The target light source is a part of the LED light sources. The target driver circuit includes an LED driver circuit, corresponding to the target light source, of the LED driver circuits.

A lighting device according to an aspect of the present invention includes the power supply device, the LED light sources, and a device body to which the LED light sources are attached.

In the power supply device and the lighting device, it is possible to provide a power supply device and a lighting device, capable of being reduced in size in comparison with the conventional device.

BRIEF DESCRIPTION OF THE DRAWINGS

The figures depict one or more implementations in accordance with the present teaching, by way of example only, not bay way of limitations. In the figure, like reference numerals refer to the same or similar elements where.

DETAILED DESCRIPTION

A power supply device in accordance with the embodiment and a lighting device with the power supply device are hereinafter explained with reference to drawings.

Figure 1:
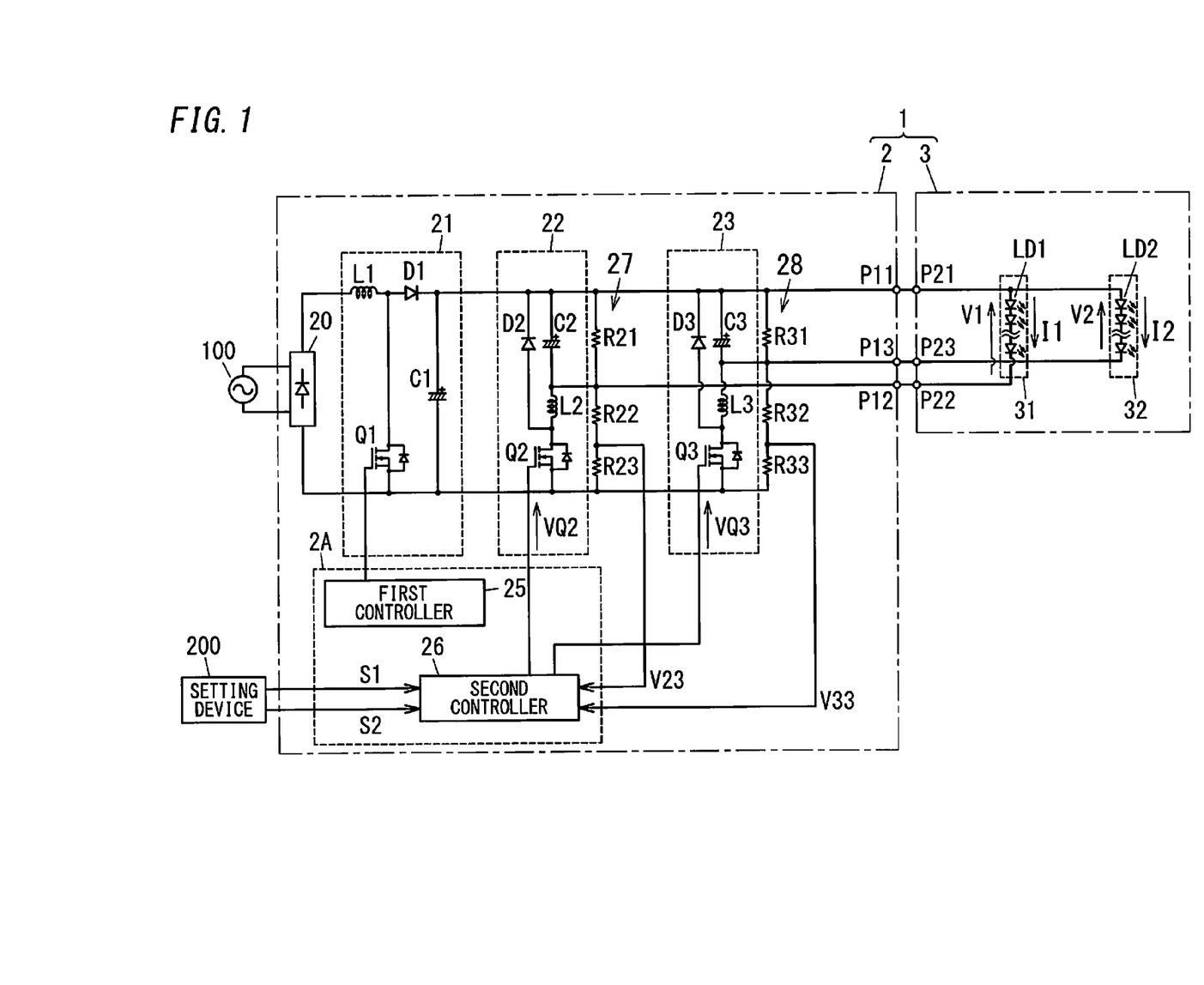
FIG. 1 is a circuit diagram of a lighting device in accordance with an embodiment.

FIG. 1 is a circuit diagram of a lighting device 1 in accordance with the embodiment. The lighting device 1 includes a power supply device 2 and a light source unit 3.

The light source unit 3 includes a (first) LED light source 31 connected between first and second terminals P21 and P22, and a (second) LED light source 32 connected between first and third terminals P21 and P23. In the embodiment, a color temperature of the LED light source 31 is different from a color temperature of the LED light source 32. The LED light source 31 includes a plurality of (e.g., seventy two) light-emitting diodes LD1, a luminescent color of each of which is a daylight color corresponding to a color temperature of about 6000K. The light-emitting diodes LD1 are connected in series between the first and second terminals P21 and P22 so as to allow a current (an electric current) to flow from the first terminal P21 to the second terminal P22. The LED light source 32 includes a plurality of (e.g., seventy two) light-emitting diodes LD2, a luminescent color of each of which is a light bulb color corresponding to a color temperature of about 3000K. The light-emitting diodes LD2 are connected in series between the first and third terminals P21 and P23 so as to allow a current to flow from the first terminal P21 to the third terminal P23.

The power supply device 2 is configured to individually supply the LED light sources 31 and 32 with respective DC (direct current) power (first DC power and second DC power). In an example of FIG. 1, the power supply device 2 includes a rectifier circuit 20, a voltage converter circuit 21, LED driver circuits 22 and 23, and a control circuit 2A. The control circuit 2A is formed of a first controller 25 and a second controller 26.

The rectifier circuit 20 is formed of a diode bridge. The rectifier circuit 20 is configured to full-wave rectify an AC (alternating current) voltage supplied from an AC power supply 100 such as a commercial AC power supply to supply a rectified voltage to the voltage converter circuit 21.

The voltage converter circuit 21 is, e.g., a step-up chopper circuit and configured to smooth the rectified voltage from the rectifier circuit 20 to convert a smoothed voltage into a first DC voltage of a first voltage (e.g., about 400V). For example, the voltage converter circuit 21 includes a choke coil L1, a switching device Q1, a diode D1, and a smoothing capacitor C1 such as an electrolytic condenser. In the example, a first end of the choke coil L1 is electrically connected to a positive output end of the rectifier circuit 20. The switching device Q1 such as a field effect transistor is electrically connected between a second end of the choke coil L1 and a negative output end of the rectifier circuit 20. An anode of the diode D1 is electrically connected to a junction of the choke coil L1 and the switching device Q1. The smoothing capacitor C1 is electrically connected between the negative output end of the rectifier circuit 20 and a cathode of the diode D1.

The first controller 25 is configured to allow the voltage converter circuit 21 to perform a step-up operation by supplying a drive signal to a control electrode (a gate) of the switching device Q1 to turn on and off the switching device Q1 at high frequency. That is, the first controller 25 is configured to adjust ON duty or frequency of the control signal supplied to the switching device Q1 so that an output voltage of the voltage converter circuit 21 is the first voltage.

The LED driver circuit 22 is, e.g., a (first) step-down chopper circuit and includes a diode D2, a smoothing capacitor C2, a choke coil L2, a switching device Q2 and resistors R21 to R23. The smoothing capacitor C2, the choke coil L2 and the switching device Q2 are connected in series to constitute a series circuit that is electrically connected between output ends of the voltage converter circuit 21 (both ends of the smoothing capacitor C1). A cathode of the diode D2 is electrically connected to a positive output end of the voltage converter circuit 21, while an anode of the diode D2 is electrically connected to a junction of the choke coil L2 and the switching device Q2. The smoothing capacitor C2 is electrically connected between first and second output terminals P11 and P12 of the power supply device 2. The first output terminal P11 is electrically connected to the first terminal P21 of the light source unit 3 through an electric wire, while the second output terminal P12 is electrically connected to the second terminal P22 of the light source unit 3 through an electric wire. The LED light source 31 is electrically connected between both ends of the smoothing capacitor C2. The resistor (a discharge resistor) R21 is electrically connected in parallel with the smoothing capacitor C2. The second controller 26 is configured to turn on and off the switching device Q2 by supplying a control signal VQ2 to a control electrode of the switching device Q2. That is, the second controller 26 is configured to allow the LED driver circuit 22 to perform a step-down operation by turning on and off the switching device Q2 at high frequency (e.g., about 50 kHz).

A series circuit of the resistors R22 and R23 is electrically connected in parallel with a series circuit of the choke coil L2 and the switching device Q2. A voltage V23 across the resistor R23 is to be supplied to the second controller 26. When a voltage to be applied across the LED light source 31, namely a voltage across the smoothing capacitor C2 is varied, an electrical potential at a junction of the resistors R21 and R22 varies. A voltage V23 across the resistor R23 varies accordingly. The second controller 26 can therefore detect a voltage applied across the LED light source 31 from amplitude of the voltage V23 across the resistor R23. In the embodiment, a first voltmeter configured to measure a voltage applied across the LED light source 31 is formed of an arithmetic function of the second controller 26, the resistors R21 to R23, and the like.

The LED driver circuit 23 is, e.g., a (second) step-down chopper circuit and includes a diode D3, a smoothing capacitor C3, a choke coil L3, a switching device Q3 and resistors R31 to R33. The smoothing capacitor C3, the choke coil L3 and the switching device Q3 are connected in series to constitute a series circuit that is electrically connected between the output ends of the voltage converter circuit 21. A cathode of the diode D3 is electrically connected to the positive output end of the voltage converter circuit 21, while an anode of the diode D3 is electrically connected to a junction of the choke coil L3 and the switching device Q3. The smoothing capacitor C3 is electrically connected between first and third output terminals P11 and P13 of the power supply device 2. The third output terminal P13 is electrically connected to the third terminal P23 of the light source unit 3 via an electric wire. The LED light source 32 is electrically connected between both ends of the smoothing capacitor C3. The resistor (a discharge resistor) R31 is electrically connected in parallel with the smoothing capacitor C3. The second controller 26 is configured to turn on and off the switching device Q3 by supplying a control signal VQ3 to a control electrode of the switching device Q3. That is, the second controller 26 is configured to allow the LED driver circuit 23 to perform a step-down operation by turning on and off the switching device Q3 at high frequency (e.g., about 50 kHz).

A series circuit of the resistors R32 and R33 is electrically connected in parallel with a series circuit of the choke coil L3 and the switching device Q3. A voltage V33 across the resistor R33 is to be supplied to the second controller 26. When a voltage to be applied across the LED light source 32, namely a voltage across the smoothing capacitor C3 is varied, an electrical potential at a junction of the resistors R31 and R32 varies. A voltage V33 across the resistor R33 varies accordingly. The second controller 26 can therefore detect a voltage applied across the LED light source 32 from amplitude of the voltage V33 across the resistor R33. In the embodiment, a second voltmeter configured to measure a voltage applied across the LED light source 32 is formed of the arithmetic function of the second controller 26, the resistors R31 to R33, and the like.

The second controller 26 is configured to receive a toning signal (a luminescent color adjusting signal) S1 and a dimming signal (a brightness adjusting signal) S2 from an external setting device 200. The second controller 26 is also configured, based on the toning signal S1 and the dimming signal S2, to adjust ON duty and frequency of the control signal VQ2 to be supplied to the switching device Q2 and ON duty and frequency of the control signal VQ3 to be supplied to the switching device Q3. Thus, the second controller 26 individually controls optical outputs of the LED light sources 31 and 32 by individually controlling both outputs (output levels) of the LED driver circuits 22 and 23. That is, a color temperature and a luminous flux of the light source unit 3 (the output light thereof) can be controlled by mixing both output lights of the LED light sources 31 and 32.

Figure 2:
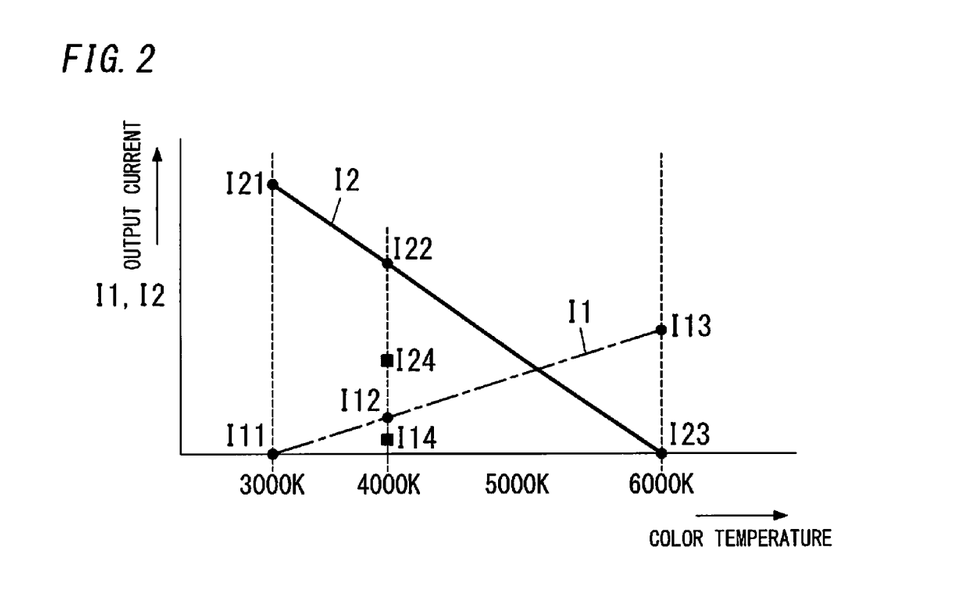
FIG. 2 is a graph depicting a relation between color temperatures of a light source unit and output currents of a power supply device in the lighting device in accordance with the embodiment.

A toning operation (a luminescent color adjusting operation) by the second controller 26 is now explained with reference to FIG. 2. In FIG. 2, a dash dot dash line shows a relation between an output current I1 of the LED driver circuit 22 (a load current flowing through the LED light source 31) and a color temperature of the light source unit 3, during toning (adjustment of a luminescent color). In FIG. 2, a solid line shows a relation between an output current I2 of the LED driver circuit 23 (a load current flowing through the LED light source 32) and a color temperature of the light source unit 3, during toning (adjustment of a luminescent color).

An operation when toning and dimming signals S1 and S2 are supplied from the setting device 200 to the second controller 26 is explained, where the toning signal S1 is a signal for setting color temperature to 3000K and the dimming signal S2 is a signal for setting luminous flux to maximum. In this case, the second controller 26 determines ON duty and frequency of the control signal VQ2 so that an output current I1 of the LED driver circuit 22 is zero (a current value I11). The second controller 26 also determines ON duty and frequency of the control signal VQ3 so that an output current I2 of the LED driver circuit 23 is a maximum value (a current value I21). The second controller 26 then controls so that the LED light source 31 of which luminescent color is the daylight color is unlit and so that the LED light source 32 of which luminescent color is the light bulb color is lit at maximum brightness. As a result, a color temperature of the light source unit 3 (a color mixing light) becomes about 3000K (a color temperature of the light bulb color).

An operation when toning and dimming signals S1 and S2 are supplied from the setting device 200 to the second controller 26 is explained, where the toning signal S1 is a signal for setting color temperature to 6000K and the dimming signal S2 is a signal for setting luminous flux to maximum. In this case, the second controller 26 determines ON duty and frequency of the control signal VQ2 so that an output current I1 of the LED driver circuit 22 is a maximum value (a current value I13). The second controller 26 also determines ON duty and frequency of the control signal VQ3 so that an output current I2 of the LED driver circuit 23 is zero (a current value I23). The second controller 26 then controls so that the LED light source 31 of which luminescent color is the daylight color is lit at maximum brightness and so that the LED light source 32 of which luminescent color is the light bulb color is unlit. As a result, a color temperature of the light source unit 3 becomes about 6000K (a color temperature of the daylight color).

An operation when toning and dimming signals S1 and S2 are supplied from the setting device 200 to the second controller 26 is explained, where the toning signal S1 is a signal for setting color temperature to above 3000K and below 6000K (e.g., 4000K), and the dimming signal S2 is a signal for setting luminous flux to maximum. In this case, the second controller 26 determines ON duty and frequency of the control signal VQ2 so that an output current I1 of the LED driver circuit 22 is a current value I12 that is set according to the toning signal S1 and that is smaller than the maximum value (the current value I13). The second controller 26 also determines ON duty and frequency of the control signal VQ3 so that an output current I2 of the LED driver circuit 23 is a current value I22 that is set according to the toning signal S1 and that is smaller than the maximum value (the current value I21). The second controller 26 then controls so that the LED light sources 31 and 32 are lit at respective brightness set according to the toning signal S1. As a result, the light source unit 3 is lit at a color temperature (e.g., 4000K) set by the toning signal S1 as a whole.

When increasing the color temperature of the light source unit 3 (a color mixing light thereof), the second controller 26 controls both outputs (output levels) of the LED driver circuits 22 and 23 to increase a current I1 flowing through the LED light source 31 and also to decrease a current I2 flowing through the LED light source 32. When decreasing the color temperature of the light source unit 3, the second controller 26 controls both outputs of the LED driver circuits 22 and 23 to decrease a current I1 flowing through the LED light source 31 and also to increase a current I2 flowing through the LED light source 32.

A dimming operation by the second controller 26 will be explained with reference to FIG. 2.

A toning and dimming operation when toning and dimming signals S1 and S2 are supplied from the setting device 200 to the second controller 26 is explained, where the toning signal S1 is a signal for setting color temperature to about 4000K and the dimming signal S2 is a signal for setting luminous flux to half as large as the maximum value. In this case, the second controller 26 determines ON duty and frequency of the control signal VQ2 so that an output current I1 of the LED driver circuit 22 is a current value I14 that is half as large as the current value I12. The second controller 26 also determines ON duty and frequency of the control signal VQ3 so that an output current I2 of the LED driver circuit 23 is a current value I24 that is half as large as the current value I22. A luminous flux from a light-emitting diode is proportional to magnitude of a current flowing through the light-emitting diode in general. Therefore, when setting the luminous flux of the light source unit 3 to half as large as the maximum value thereof, the second controller 26 controls so that a current flowing through the light-emitting diodes of each LED light source is half as large as a current value when a luminous flux thereof has a maximum value. In accordance with the toning and dimming control by the second controller 26, the LED light sources 31 and 32 are lit at respective brightness and controlled so that the color temperature of the light source unit 3 becomes about 4000K set by the toning signal S1 and the luminous flux thereof becomes half as large as the maximum value.

The second controller 26 is configured to receive a voltage V23 across the resistor R23 and a voltage V33 across the resistor R33. The second controller 26 is configured to compare the voltages V23 and V33 with respective thresholds to judge whether a circuit malfunction occurs. When the voltage V23 is above the threshold thereof or the voltage V33 is above the threshold thereof, the second controller 26 judges that the malfunction occurs. In this case, the second controller 26 stops the step-down operation by turning off the switching devices Q2 and Q3.

Figure 5:
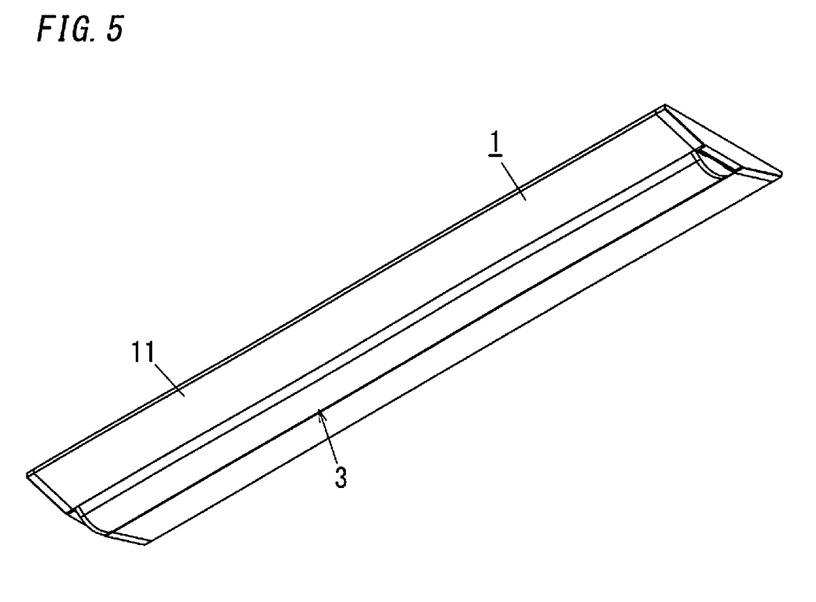
FIG. 5 is a perspective view of the lighting device in accordance with the embodiment.

Structure of the lighting device 1 is explained with reference to FIGS. 5 and 6. The lighting device 1 according to the embodiment is a ceiling-mounting lighting.

The lighting device 1 includes a device body 11 configured to be mounted on a ceiling, and the light source unit 3 configured to be detachably attached to the device body 11.

The device body 11 is made of a pressed metal plate, and has a recess 12 that is configured to house the light source unit 3 and that is provided in a lower face of the device body 11 along the whole length thereof.

Figure 6:
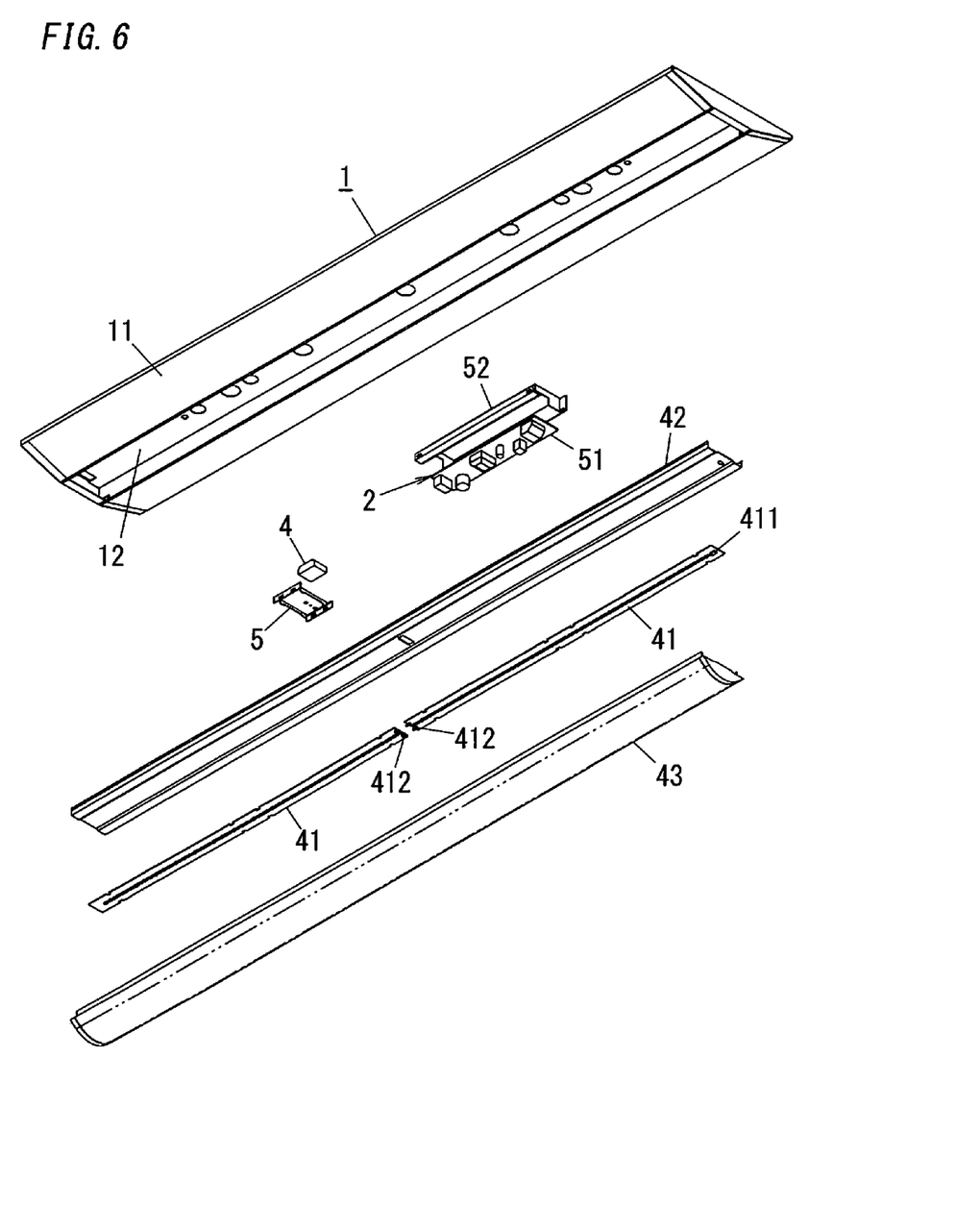
FIG. 6 is an exploded perspective view of the lighting device in accordance with the embodiment.

As shown in FIG. 6, the light source unit 3 includes two circuit boards 41, a rectangular mounted member 42 to which the circuit boards 41 are attached with the circuit boards 41 aligned in a longitudinal direction of the mounted member 42, and a cover 43 configured to be attached to the mounted member 42 to cover the circuit boards 41.

Each circuit board 41 is a printed circuit board that is shaped like a long narrow rectangle. Light-emitting diodes LD1 constituting the LED light source 31 are mounted on a lower face of one of the circuit boards 41 (a face opposed to the cover 43) so as to be disposed at regular intervals in the longitudinal direction thereof. Hereinafter, this circuit board 41 is also referred to as a "first circuit board". Similarly, light-emitting diodes LD2 constituting the LED light source 32 are mounted on a lower face of another of the circuit boards 41 so as to be disposed at regular intervals in the longitudinal direction thereof. Hereinafter, this circuit board 41 is also referred to as a "second circuit board". Alternatively, the light-emitting diodes LD1 and the light-emitting diodes LD2 may be alternately mounted on the circuit boards 41 in their longitudinal directions so that each two adjoining light-emitting diodes are different from each other.

A connector 411 is provided at the first circuit board 41 (a right circuit board 41 in FIG. 6) that is configured to be electrically connected to the first to third output terminals P11 to P13 of the power supply device 2 via an electric cord. The first circuit board 41 is formed with conduction paths such as copper layers that are electrically connected to the first to third terminals P21 to P23 included in the connector 411. Two connectors 412 configured to electrically connect the circuit boards 41 are provided at facing ends of the circuit boards 41. By joining the connectors 412 of the circuit boards 41, power supplied from the power supply device 2 to the first circuit board 41 can be supplied to the second circuit board 41 (a left circuit board 41 in FIG. 6). The embodiment includes two circuit boards 41 on which the light-emitting diodes LD1 and LD2 are mounted, but the number of the circuit boards 41 may be changed according to the required number of the light-emitting diodes LD1 and LD2.

The mounted member 42 is made of a bent metal plate and has a cross-sectional shape like a U as viewed in the longitudinal direction thereof. The two circuit boards 41 are attached on a lower face of the mounted member 42 with the light-emitting diodes LD1 and LD2 directed downward. The power supply device 2 and a terminal block 4 are attached on an upper face of the mounted member 42. An input cable (including two or three wires) of the power supply device 2 is electrically connected to the terminal block 4. The terminal block 4 is configured to be electrically connected with a power cable (including two or three wires) fed into a room below via a hole cut in a ceiling material (a dropped ceiling) from a ceiling space above the ceiling material. The power cable is therefore to be electrically connected to the power supply device 2 via the terminal block 4. The terminal block 4 is fixed to the upper face of the mounted member 42 with a metal fitting(s) 5.

The cover 43 is made from synthetic resin material having translucency and scattering property (e.g., milky-white acrylic resin), and is a long piece having an opening in an upper face thereof (a face at a side of the mounted member 42). The cover 43 is in a shape of a semicircle protruding downward as viewed from a lateral thereof. The cover 43 is attached to the mounted member 42 to cover the two circuit boards 41.

Figure 7:
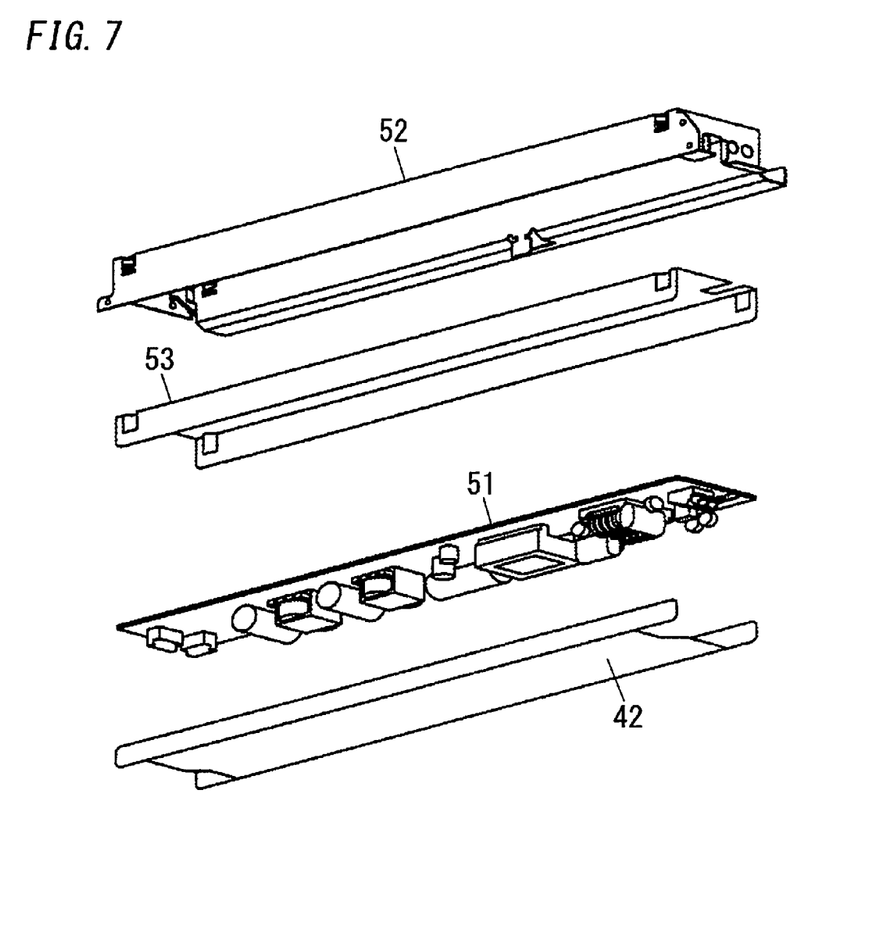
FIG. 7 is an exploded perspective view of the power supply device in accordance with the embodiment.

The power supply device 2 is attached on the upper face of the mounted member 42. As shown in FIGS. 6 and 7, the power supply device 2 includes a circuit board 51, a case 52 and an insulation sheet 53.

The case 52 is made of a pressed metal plate and is shaped like a box with a bottom opening. The case 52 is fixed on the upper face of the mounted member 42 with the circuit board 51 housed therein.

The insulation sheet 53 is made from synthetic resin having an electrical insulation property and shaped like a U as viewed from a lateral thereof. The insulation sheet 53 is disposed inside the case 52 and electrically insulates the circuit board 51 from the case 52.

The circuit board 51 is formed of a printed circuit board and shaped like a long narrow rectangle. For example, the circuit board 51 is a double-sided printed wiring board. As stated above, the power supply device 2 shown in FIG. 1 is formed of the rectifier circuit 20, the voltage converter circuit 21, the LED driver circuit 22, the LED driver circuit 23, the first controller 25, second controller 26 and the like. Component parts constituting the power supply device 2 are mounted on both sides of the circuit board 51.

When the color temperature of the light source unit 3 is tuned to a color temperature of the daylight color (about 6000K), the power supply device 2 according to the embodiment allows a current to flow through only the LED light source 31 of which luminescent color is the daylight color and to prohibit current from flowing through the LED light source 32 of which luminescent color is the light bulb color.

In this case, it is assumed that the second controller 26 sets ON duty of the control signal VQ3 to 0% to completely turn off the switching device Q3 of the LED driver circuit 23. The voltage V2 across the LED light source 32 corresponds to a voltage determined by a division ratio of the resistor R31, R32 and R33. That is, the voltage V2 across the LED light source 32 corresponds to a divided voltage determined by: an output voltage of the voltage converter circuit 21; resistance of the resistor R31; and combined resistance of the resistors R32 and R33. The resistor R31 is provided for discharge of an electric charge stored in the smoothing capacitor C3 when power from the AC power supply 100 to the voltage converter circuit 21 is shut off. A resistance value of the resistor R31 is set to be considerably smaller than the combined resistance of the resistors R32 and R33 so that the electric charge stored in the smoothing capacitor C3 is discharged promptly. Accordingly, when the LED light source 32 is unlit by completely turning off the switching device Q3, the voltage V2 across the LED light source 32 largely decreases in comparison with the voltage V1 across the LED light source 31 when it is lit. When the number of the light-emitting diodes LD1 constituting the LED light source 31 is seventy two and a forward voltage of each light-emitting diode LD1 when it is lit is about 3V (see FIG. 3), the voltage V1 across the LED light source 31 when it is lit is 216V (=72×3). In each circuit board 41, a large potential difference accordingly occurs between a conduction path electrically connected to a cathode end of the LED light source 31 when it is lit (a conduction path electrically connected to the second terminal P22) and a conduction path electrically connected to a cathode end of the LED light source 32 when it is unlit (a conduction path electrically connected to the third terminal P23). Similarly, in the circuit board 51, a large potential difference occurs between a conduction path electrically connected to the cathode end of the LED light source 31 when it is lit (a conduction path electrically connected to the second output terminal P12) and a conduction path electrically connected to the cathode end of the LED light source 32 when it is unlit (a conduction path electrically connected to the third output terminal P13). The circuit board 51 requires spacing out the conduction path electrically connected to the second output terminal P12 and the conduction path electrically connected to the third output terminal P13 in order to ensure electrical insulation therebetween. This causes the power supply device 2 to increase in size because a width thereof needs to be increased.

Figure 3:
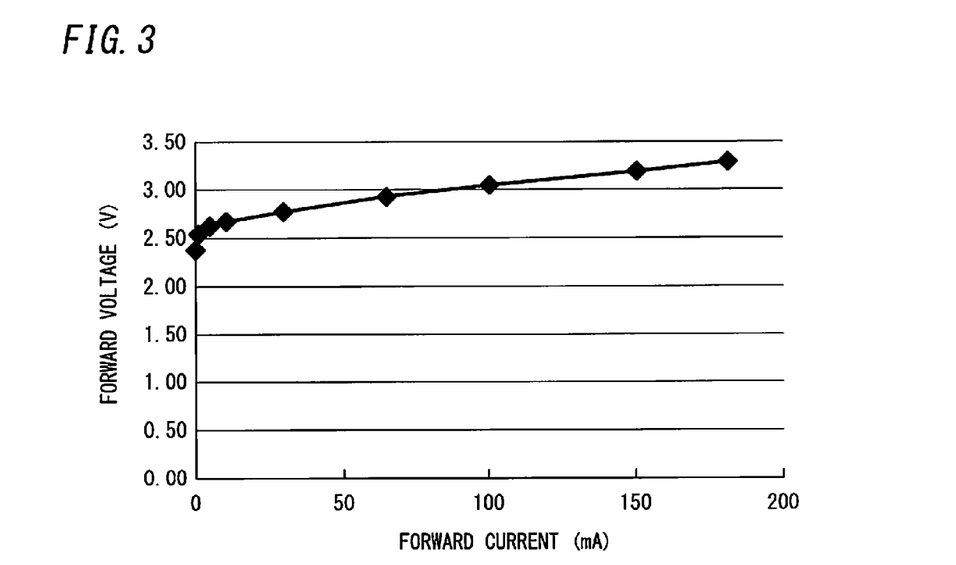
FIG. 3 is a graph depicting a relation between forward-currents and forward voltages of a light-emitting diode used for the lighting device in accordance with the embodiment.

FIG. 3 shows a measurement result of a characteristic between forward-currents and forward voltages of a light-emitting diode such as a light-emitting diode LD1 or LD2, where the light-emitting diode LD1 is a type of neutral white and the light-emitting diode LD2 is a type of light bulb color, which can be realized by a blue LED combined with phosphor. It can be seen from the measurement result that no current flows through each of the light-emitting diodes LD1 and LD2 when a forward voltage thereof is 2V or less.

Therefore, when extinguishing, for example, the LED light source 32, the second controller 26 turns on and off (oscillates) the switching Q3 of the LED driver circuit 23 so that a voltage V2 applied across the LED light source 32 keeps a high voltage in a range in which the LED light source 32 is not lit. As stated above, each of the light-emitting diodes LD1 and LD2 is not lit when a forward voltage thereof is 2V or less. The LED light source 32 is therefore unlit even if a voltage of 144V (=2×72) is applied across the LED light source 32 formed of 72 light-emitting diodes LD2 connected in series. In the embodiment, a margin of about 15% is therefore set with respect to 144V. In this case, the second controller 26 is configured to turn on and off the switching device Q3 so that the voltage applied across the LED light source 32 to be unlit is kept to a voltage in a voltage range of 110V or more and 120V or less.

An operation of the second controller 26 as stated above is explained with reference to FIG. 4.

Figure 4:
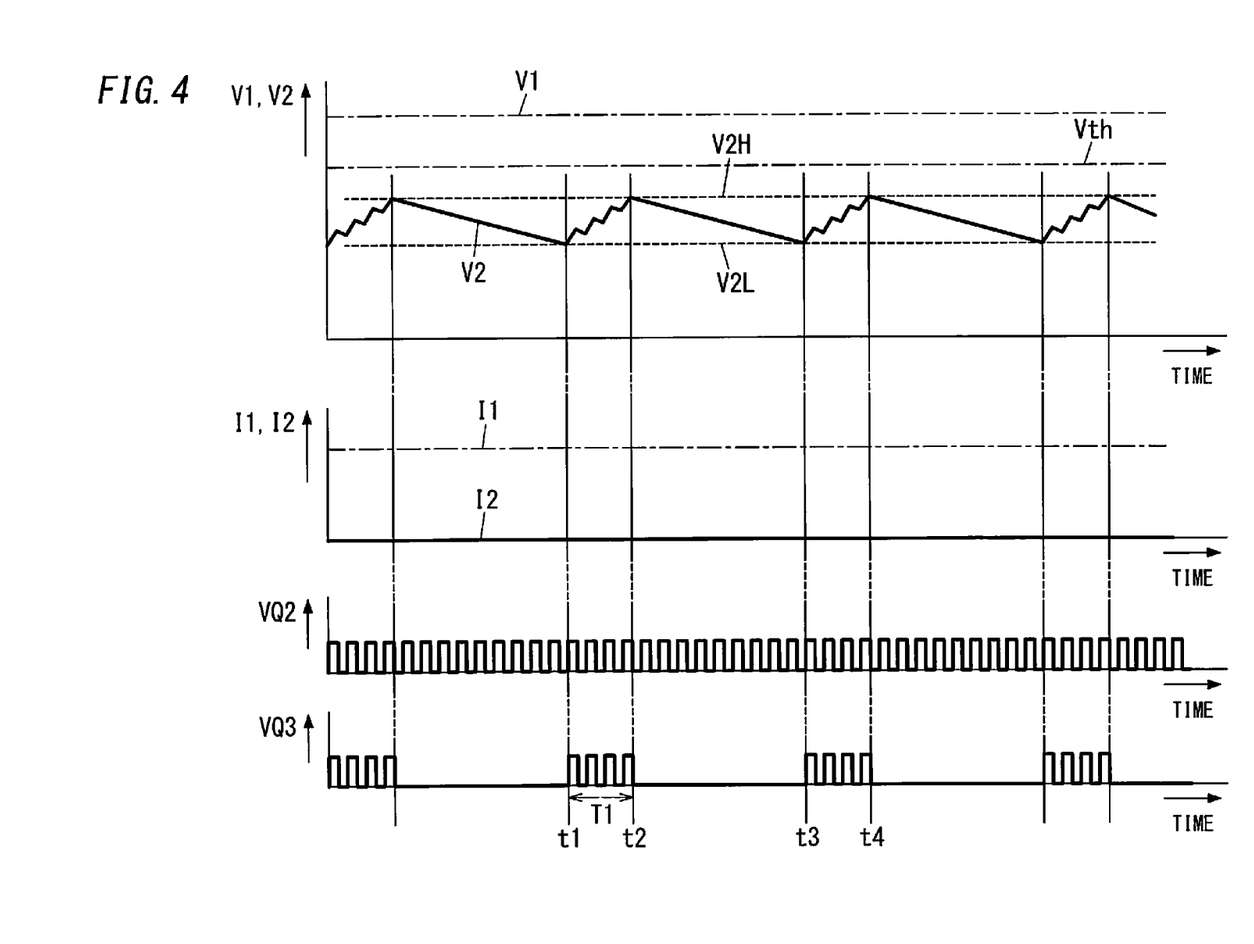
FIG. 4 is waveform charts of main parts of the power supply device in accordance with the embodiment.

FIG. 4 is waveform charts of main parts of the power supply device 2 when, at an upper limit of a color temperature adjusting range, the LED light source 31 is lit and the LED light source 32 is unlit, namely when a current I1 flows through only the LED light source 31 and current is prohibited from flowing through the LED light source 32.

The second controller 26 lights the LED light source 31 by turning on and off the switching device Q2 at ON duty of the control signal VQ2 to supply a current I1 according to the dimming signal S2 to the LED light source 31 through the LED driver circuit 22.

The second controller 26 also controls so that a voltage V2 applied to the LED light source 32 through which current is prohibited from flowing is kept to a voltage as high as possible in a range lower than a threshold voltage at which current starts to flow through the LED light source 32. For example, the threshold voltage is about 172.8V (=2.4×72) and a threshold voltage to each light-emitting diode LD2 is about 2.4V (see FIG. 3). The second controller 26 always monitors the voltage V1 across the LED light source 31 based on the voltage V23 across the resistor R23, and always monitors the voltage V2 across the LED light source 32 based on the voltage V33 across the resistor R33. The second controller 26 starts a switching operation of the switching device Q3 when the voltage V2 applied across the LED light source 32 decreases to a lower limit voltage (an oscillation start voltage) V2L (e.g., 110V) (a time t1 in FIG. 4). When the switching device Q3 starts the switching operation, an output voltage of the LED driver circuit 23, namely the voltage V2 applied across the LED light source 32 increases by the chopper operation of the LED driver circuit 23. When the voltage V2 across the LED light source 32 increases to an upper limit voltage (an oscillation stop voltage) V2H (e.g., 120V) (a time t2 in FIG. 4), the second controller 26 stops the switching operation of the switching device Q3. After the LED driver circuit 23 stops the chopper operation, an output voltage of the LED driver circuit 23, namely the voltage V2 across the LED light source 32 gradually decreases. Subsequently, when the voltage V2 across the LED light source 32 decreases to the lower limit voltage V2L (a time t3 in FIG. 4), the second controller 26 starts the switching operation of the switching device Q3 again, thereby increasing the voltage V2. When the voltage V2 across the LED light source 32 increases to the upper limit voltage V2H (a time t4 in FIG. 4), the second controller 26 stops the switching operation of the switching device Q3. That is, the switching operation of the switching device Q3 is intermittently performed. While the LED light source 32 is unlit, the second controller 26 repeats the abovementioned operation. As a result, the voltage V2 across the LED light source 32 is kept to a voltage as high as possible in the range in which current is prohibited from flowing through the LED light source 32.

The second controller 26 may be configured, when the voltage V2 across the LED light source 32 decreases to the lower limit voltage V2L (the time t1 in FIG. 4) with current prohibited from flowing through the LED light source 32, to turn on and off (oscillate) the switching device Q3 for a constant time T1. The constant time T1 may be set to a time that allows the voltage V2 across the LED light source 32 to increase by about 10V and that is shorter than a time that allows the voltage V2 to increase and exceed the aforementioned threshold voltage. For example, the constant time T1 may be 5 milliseconds. When the voltage V2 across the LED light source 32 decreases to the lower limit voltage V2L, the second controller 26 turns on and off (oscillates) the switching device Q3 for the constant time, thereby keeping the voltage V2 to a voltage as high as possible in the range in which current is prohibited from flowing through the LED light source 32.

At the lower limit of the color temperature adjusting range, the second controller 26 controls so that the LED light sources 31 and 32 are unlit and lit, respectively. In this case, a current I2 flows through only the second LED light source 32, while current is prohibited from flowing through the LED light source 31. Like a case where the LED light source 32 is unlit (extinguished), the second controller 26 keeps the voltage across the LED light source 31 to a voltage as high as possible in a range in which current is prohibited from flowing through the LED light source 31.

In the embodiment, the second controller 26 is configured, when current is prohibited from flowing through the LED light source 32, to keep a voltage V2 across the LED light source 32 to a voltage lower than a threshold voltage (a first threshold voltage) at which current starts to flow through the LED light source 32, which is a voltage of 85% or 70% of the (first) threshold voltage for example. It is accordingly possible to decrease a potential difference between a voltage at the cathode end of the LED light source 31 (a voltage at the second terminal P22) when it is lit and a voltage at the cathode end of the LED light source 32 (a voltage at the third terminal P23) when it is unlit (extinguished), in comparison with a case where a voltage across the LED light source 32 when it is unlit is zero. The second controller 26 is configured, when current is prohibited from flowing through the LED light source 31, to keep a voltage V1 across the LED light source 31 to a voltage lower than a threshold voltage (a second threshold voltage) at which current starts to flow through the LED light source 31, which is a voltage of 85% or 70% of the (second) threshold voltage for example. It is accordingly possible to decrease a potential difference between a voltage at the cathode end of the LED light source 32 (a voltage at the third terminal P23) when it is lit and a voltage at the cathode end of the LED light source 31 (a voltage at the second terminal P22) when it is unlit (extinguished), in comparison with a case where a voltage across the LED light source 31 when it is unlit is zero.

In each circuit board 41, it is possible to shorten a distance that is provided between a conduction path electrically connected to the second terminal P22 and a conduction path electrically connected to the third terminal P23 in order to ensure electrical insulation therebetween, in comparison with a case where a voltage across the LED light source 31 or the LED light source 32 when it is unlit is zero. Similarly, in the circuit board 51, it is possible to shorten a distance that is provided between a conduction path electrically connected to the second output terminal P12 and a conduction path electrically connected to the third output terminal P13 in order to ensure electrical insulation therebetween, in comparison with a case where a voltage across the LED light source 31 or the LED light source 32 when it is unlit is zero. It is therefore possible to reduce the circuit boards 41 and 51 in size to reduce the power supply device 2 and the light source unit 3 in size, thereby to house the power supply device 2 and the light source unit 3 in the device body 11 having a small width according to decrement obtained by reducing the circuit boards 41 and 51 in size.

At the upper limit of the color temperature adjusting range, the light source unit 3 can emit a light at the color temperature of the LED light source 31 (the luminescent color thereof) as a whole because current is prohibited from flowing through the LED light source 32 having a low color temperature. At the lower limit of the color temperature adjusting range, the light source unit 3 can emit a light at the color temperature of the LED light source 32 (the luminescent color thereof) as a whole because current is prohibited from flowing through the LED light source 31 having a high color temperature. It is therefore possible to widen the color temperature adjusting range in comparison with a case where both of the LED light sources 31 and 32 are lit at each of upper and lower limits of the color temperature adjusting range.

As stated above, the power supply device 2 according to the embodiment includes LED driver circuits (the LED driver circuits 22 and 23) electrically connected to LED light sources (the LED light source 31 and 32), respectively, and a control circuit 2A (specifically the second controller 26). Each of the LED light sources includes light-emitting diodes (light-emitting diodes LD1 or LD2) electrically connected in series. Ends, on anode sides, of the LED light sources are electrically connected to each other. The control circuit 2A (26) is configured to adjust electric currents flowing through the LED light sources 31 and 32 through the LED driver circuits 22 and 23, respectively. The control circuit 2A is configured, when current is prohibited from flowing through a target light source (31 or 32), to perform control of a target driver circuit (22 or 23) so that a voltage lower than a threshold voltage at which current starts to flow through the target light source is applied across the target light source. The target light source is a part (e.g., one) of the LED light sources. The target driver circuit includes an LED driver circuit(s), corresponding to the target light source, of the LED driver circuits. The voltage which the control circuit 2A allows the target driver circuit to apply across the target light source is above zero voltage and below the threshold voltage.

In this architecture, it is possible to reduce a potential difference between an end, of a cathode side, of the target light source and an end, of a cathode side, of an LED light source through which a current flows, in comparison with a case where a voltage across an LED light source through which current is prohibited from flowing is zero. It is possible to shorten a distance that is provided between a conduction path electrically connected to the end, of the cathode side, of the target light source and a conduction path electrically connected to the end, of the cathode side, of the LED light source through which the current flows in order to ensure electrical insulation therebetween because the potential difference therebetween is reduced. As a result, the circuit boards of the power supply device can be reduced in size and a whole size of the power supply device can be reduced.

The power supply device 2 according to the embodiment may include voltmeters (voltage measuring circuits) 27 and 28 configured to measure voltages across the LED light sources 31 and 32, respectively. In the example of FIG. 1, the voltmeter 27 is formed of resistors R21 to R23 and the control circuit 2A (specifically second controller 26), while the voltmeter 28 is formed of resistors R31 to R33 and the control circuit 2A (specifically second controller 26). Each of the LED driver circuits 22 and 23 may be a chopper circuit. It is desirable that the control circuit 2A (specifically second controller 26) be configured, when a voltage measured with a voltmeter, corresponding to the target light source, of the voltmeters 27 and 28 decreases to a lower limit voltage V2L that is lower than the threshold voltage Vth, to allow the target driver circuit to intermittently perform a chopper operation for increasing a voltage across the target light source.

The control circuit 2A (specifically second controller 26) may be configured to allow the target driver circuit to stop the chopper operation when a voltage that is higher than the lower limit voltage V2L and lower than the threshold voltage Vth is applied across the target light source, thereby allowing the target driver circuit to intermittently perform the chopper operation. In an example, the voltage that is higher than the lower limit voltage V2L and lower than the threshold voltage Vth is the upper limit voltage V2H. In another example, the voltage that is higher than the lower limit voltage V2L and lower than the threshold voltage Vth is an output voltage of the target driver circuit at the elapse of the constant time T1 from a time point when the voltage measured with the voltmeter corresponding to the target light source decreases to the lower limit voltage V2L.

It is accordingly possible to apply a voltage, which is the lower limit voltage or more and the upper limit voltage or less, across the target light source because the control circuit 2A performs the aforementioned control of the target driver circuit when a voltage across the target light source is in the range of the lower limit voltage to the upper limit voltage. It is possible to shorten the distance that is provided between the conduction path electrically connected to the end, of the cathode side, of the target light source and the conduction path electrically connected to the end, of the cathode side, of the LED light source through which the current flows in order to ensure electrical insulation therebetween because the potential difference therebetween is reduced.

The lighting device 1 according to the embodiment includes the aforementioned power supply device 2, the LED light sources (the LED light sources 31 and 32) electrically connected to the LED driver circuits (22 and 23), and the device body 11 to which the LED light sources are attached.

The lighting device 1 includes the power supply device 2, and it is accordingly possible to reduce the lighting device 1 in size.

In the lighting device 1, color temperatures of the LED light sources (the LED light sources 31 and 32) (luminescent colors thereof) may be different from each other.

A color temperature of the light source unit 3 (a color mixing light thereof) can be therefore adjusted by controlling outputs (output levels) of the LED light sources.

In the example of FIG. 4, the lower limit voltage V2L is 110V, and the upper limit voltage V2H is 120V. In this case, the upper limit voltage V2H is set based on the voltage of 144V that is lower than a threshold voltage Vth (about 172.8V) of an LED light source 31 or 32. That is, an LED light source 31 or 32 can be prevented from lighting by setting the upper limit voltage V2H to 120V so that a margin of about 15% is provided for 144V. In addition, 110V which is 10V lower than the upper limit voltage V2H is set as the lower limit voltage V2L in order to apply a voltage as high as possible across an LED light source 31 or 32.

In other words, the upper limit voltage V2H is set to a voltage that is about 70% of the threshold voltage Vth, while the lower limit voltage V2L is set to a voltage that is about 64% of the threshold voltage Vth. Thus, by setting the lower limit voltage V2L to the voltage that is lower than the threshold voltage Vth (desirably the upper limit voltage V2H) and equal to or higher than about 60% of the threshold voltage Vth, it is possible to provide the power supply device capable of being reduced in size in comparison with the conventional device.

The upper limit voltage V2H is desirably set to a voltage that is about 84 to 85% of the threshold voltage Vth because it is desirable that the lower limit voltage V2L be set to a voltage as high as possible. When the upper limit voltage V2H is set to about 145V for example, the lower limit voltage V2L may be the same as the upper limit voltage V2H but is desirably set to a voltage lower than the upper limit voltage V2H owing to feedback control. For example, the lower limit voltage V2L may be set to about 135V (about 75 to 80% of the threshold voltage Vth). Thus, it is desirable that the lower limit voltage V2L be set to a voltage that is lower than the threshold voltage Vth (desirably the upper limit voltage V2H) and equal to or higher than about 75% of the threshold voltage Vth. It is more desirable that the lower limit voltage V2L be set to a voltage that is lower than the threshold voltage Vth (desirably the upper limit voltage V2H) and equal to or higher than about 80% of the threshold voltage Vth.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A power supply device, comprising:
LED driver circuits electrically connected to LED light sources, respectively; and
a control circuit, wherein
each of the LED light sources comprises light-emitting diodes electrically connected in series,
ends, on anode sides, of the LED light sources are electrically connected to each other,
the control circuit is configured to adjust electric currents flowing through the LED light sources through the LED driver circuits, respectively, and
the control circuit is configured, when current is prohibited from flowing through a target light source, to perform control of a target driver circuit so that a voltage lower than a threshold voltage at which current starts to flow through the target light source is applied across the target light source, the target light source being a part of the LED light sources, the target driver circuit comprising an LED driver circuit, corresponding to the target light source, of the LED driver circuits.

2. The power supply device of claim 1, further comprising:
voltmeters configured to measure voltages across the LED light sources, respectively, wherein
each of the LED driver circuits is a chopper circuit, and
the control circuit is configured, when a voltage measured with one of the voltmeters, corresponding to the target light source, decreases to a lower limit voltage that is lower than the threshold voltage, to allow the target driver circuit to intermittently perform a chopper operation for increasing a voltage across the target light source.

3. The power supply device of claim 2, wherein the control circuit is configured to allow the target driver circuit to stop the chopper operation when a voltage that is higher than the lower limit voltage and lower than the threshold voltage is applied across the target light source, thereby allowing the target driver circuit to intermittently perform the chopper operation.

4. A lighting device, comprising:
the power supply device of claim 3;
the LED light sources; and
a device body to which the LED light sources are attached.

5. The lighting device of claim 4, wherein color temperatures of the LED light sources are different from each other.

6. A lighting device, comprising:
the power supply device of claim 2;
the LED light sources; and
a device body to which the LED light sources are attached.

7. The lighting device of claim 6, wherein color temperatures of the LED light sources are different from each other.

8. The power supply device of claim 1, wherein the voltage lower than the threshold voltage at which current starts to flow through the target light source is equal to or higher than 60% of the threshold voltage.

9. The power supply device of claim 8, wherein the voltage lower than the threshold voltage at which current starts to flow through the target light source is equal to or higher than 75% or 80% of the threshold voltage.

10. A lighting device, comprising:
the power supply device of claim 9;
the LED light sources; and
a device body to which the LED light sources are attached.

11. The lighting device of claim 10, wherein color temperatures of the LED light sources are different from each other.

12. A lighting device, comprising:
the power supply device of claim 8;

the LED light sources; and a device body to which the LED light sources are attached.

13. The lighting device of claim 12, wherein color temperatures of the LED light sources are different from each other.

14. A lighting device, comprising:

the power supply device of claim 1;

the LED light sources; and a device body to which the LED light sources are attached.

15. The lighting device of claim 14, wherein color temperatures of the LED light sources are different from each other.

* * * * *